United States Patent
Halsey

[11] 3,765,228
[45] Oct. 16, 1973

[54] NON-DESTRUCTIVE TESTING ARRANGEMENTS - MOVABLE REFLECTORS

[76] Inventor: George H. Halsey, 63 Shady Dr., Indiana, Pa. 15701

[22] Filed: July 14, 1971

[21] Appl. No.: 162,511

[52] U.S. Cl. .................... 73/67.5, 73/67.6, 73/67.7
[51] Int. Cl. ............................................. G01n 29/04
[58] Field of Search.................. 73/67.5, 67.6, 67.7, 73/67.8, 71.5; 250/83.3 D, 219 DF; 356/239

[56] References Cited
UNITED STATES PATENTS
2,862,384  12/1958  Renaut.................................. 73/67.6
3,206,606  9/1965   Burgo et al. .................. 250/219 DF

*Primary Examiner*—James J. Gill
*Attorney*—Donn J. Smith

[57] ABSTRACT

A non-destructive testing arrangement comprises a source of reflectable penetrative energy, a reflector structure, and means for rotatably mounting the reflector structure at a position such that an energy envelope of the source is substantially intercepted by the reflector structure. Reflective means are mounted on the reflector structure and disposed for reflecting successive increments of an intercepted area of the energy envelope and a relatively small receiver for the testing energy is juxtaposed to the reflector structure for receiving the reflected increments. The receiver has about the same order of active area as that of one of the reflected increments. Means are provided for positioning a specimen to be inspected between the reflctor structure and one of the energy source and the receiver so as to intercept the energy.

22 Claims, 17 Drawing Figures

3,765,228

INVENTOR
George H. Halsey
BY Donna Smith
HIS ATTORNEY

INVENTOR
George H. Halsey
BY Don Smith
HIS ATTORNEY

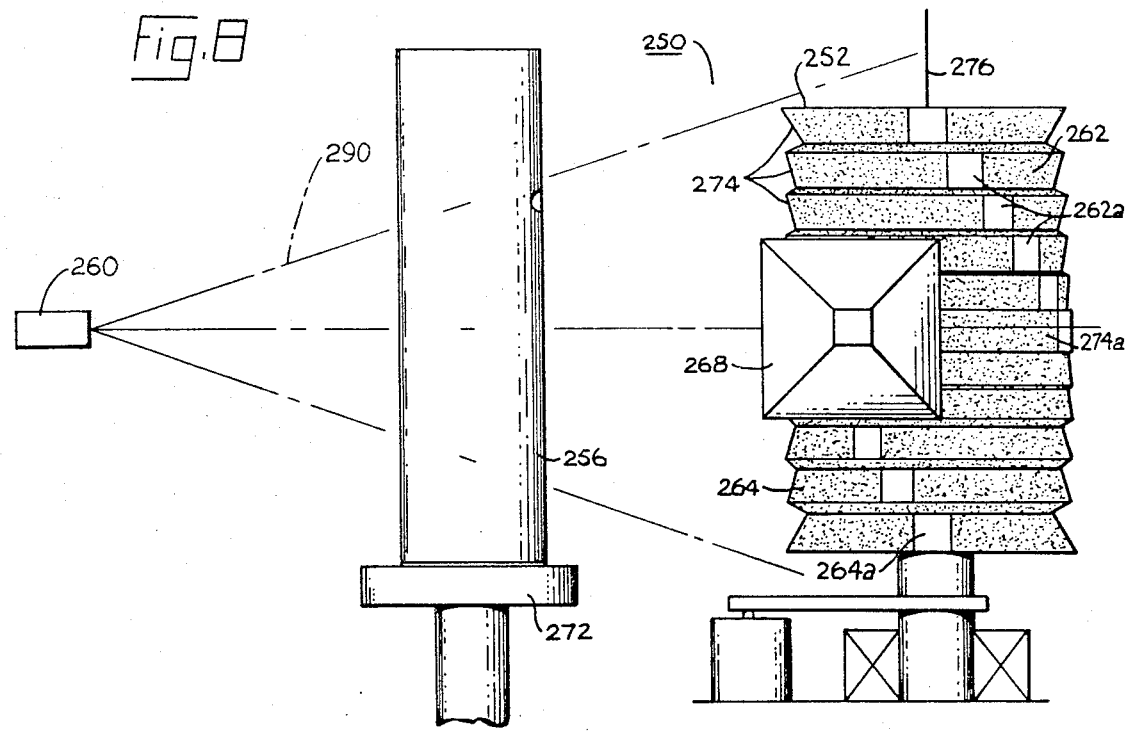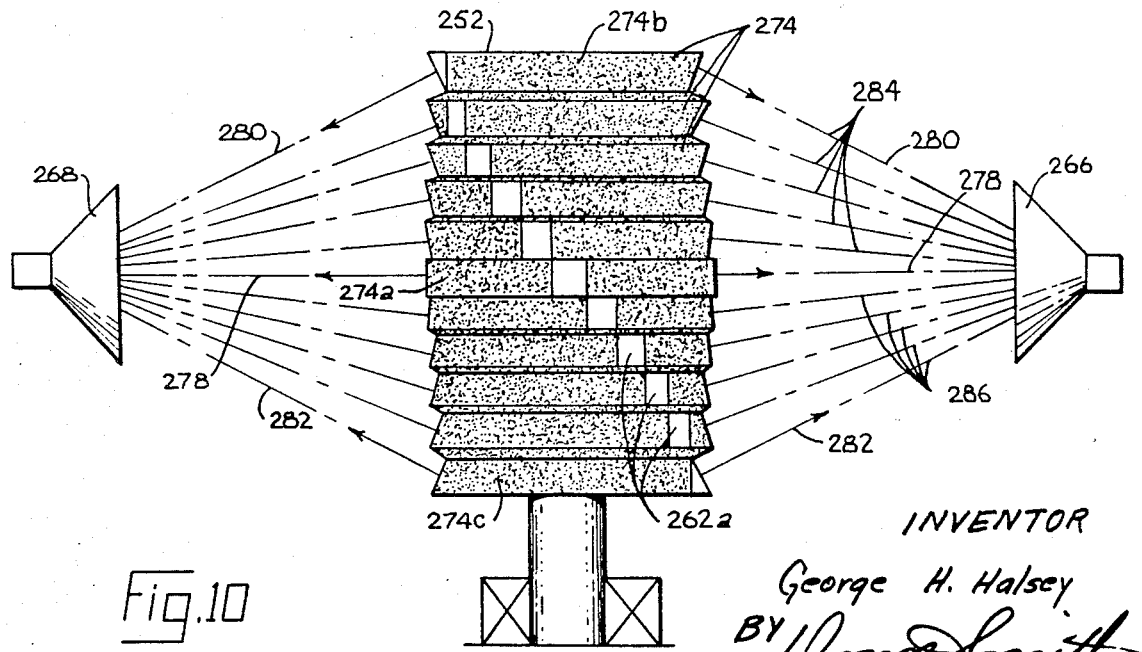

NON-DESTRUCTIVE TESTING ARRANGEMENTS - MOVABLE REFLECTORS

This present invention is related to the non-destructive testing arrangements described and claimed in my copending applications filed concurrently herewith and respectively entitled Non-destructive Testing Procedures, Ser. No. 162,510 and Non-destructive Testing Procedures — Movable Receivers, Ser. No. 162,597.

The present invention relates to non-destructive testing procedures and more particularly to procedures of the character described which are capable of utilizing various forms of penetrative energies such as ultrasonics and microwaves, or combinations thereof.

The invention provides means for effectively scanning an object for defects, or physical properties, by imparting a series of predetermined movements to the test specimen or by reflecting successive movements of a projected image of the object, or by a combination of these. The scanning can be repetitive to increase the sensitivity of the testing arrangement.

Known testing procedures have been unable to inspect properly for such defects as undue porosity, occlusions of foreign matter, and gage variations, when energies of relatively long wave length (such as x-band microwaves or relatively low frequency ultrasonics) are utilized. The problem arises from the defect having a much smaller size than the wave length of these testing energies, as a very small defect has only a negligible effect upon a much larger wave in conventional testing procedures. The waves therefore, are incapable of carrying intelligible information to conventional receivers sensitive to the testing energies in use.

It is an unexpected result of the invention that small defects can be detected irrespective of relatively long wave lengths by utilizing one of the disclosed receiver arrangements for the testing energy. An ancillary feature of the invention, also quite unexpected, is the use of a particular motion or combinations of motions imparted to the test object for increasing the sensitivity of a particular receiver arrangement and for scanning the object. Owing to the absence of the order of sensitivity afforded by the invention, prior inspectional procedures have been unable to detect cure states, very small defects or occlusions, and certain types of porosity.

With this arrangement a very small anomaly or defect can be detected, even as small as one percent of the wave length. Thus, when using x-band microwaves as the energy source, an anomaly as small as 0.012 inch can be detected. In this area a segmented receiver or some form of scanning arrangement or multiple exposure of the test objects, as provided by the invention, is highly desirable. With the testing arrangements of the invention, an anomaly, although very small occupies a correspondingly larger percentage of the area of a given receiver increment. Moreover, the receiver system of the novel testing arrangement unexpectedly is able to sense turbulences in a relatively long wave energy passing around the anomaly. Detection of these turbulences is facilitated by a particular movement of the test object, when this feature of the invention is used, and also by repetitive scanning of the test object, all of which can provide a higher signal-to-noise ratio in accordance with the invention. The use of an incremental or segmented receiver coupled with movement of the object allows the very small anomaly to be inspected from slightly different locations simultaneously by a corresponding number of receiver increments. The signal integration or scan-averaging thus afforded by the invention, increases the efficiency the sensitivity of the testing arrangement in a surprising and unobvious fashion.

As noted previously, none of these beneficial advantages of the invention can be supplied by known non-destructive testing arrangements. The benefits of being able to detect anomalies of the order or one-fourth inch in diameter or less or the cure states of various types of elastomers for example, without destructive testing, need scarcely be pointed out. Previous approaches have been to employ extremely high frequencies with related shorter waves to obtain some increase in resolution capability. This approach has been generally unsatisfactory, owing to equipment limitations and difficulties in handling ultra short wave energies. In the case of microwaves, another previous approach in the case of void detection has been to use the void as a secondary source and sense radiation at the 90° plane for a primary source, as an indication of the void location. Very high frequency systems are more expensive and less reliable in the case of microwave hardware, while ultrasonics require liquid couplants at the designated frequency. Use of the conventional microwave secondary source also have size limitations and is capable of detecting only voids in the test object.

The invention, then, relates to the inspection measurement, testing and control of materials, products, parts, processes and assemblies by use of non-destructive testing equipment procedures and methods, without sacrifice of acceptable items. The invention relates to the non-destructive measurement of the physical properties in metallic and non-metallic items in general, or combinations thereof, and also to improved means for the detection, location and measurement of local internal anomalies within these items. Such anomalies include, of course, the absence of the proper state of cure at a given location within the material or other test object. Similarly the testing procedures of the invention can detect the presence or absence of a bonding between similar or dissimilar materials or other components.

I am not aware of any acceptable solution to the particular problems set forth herein and involving of internal physical properties of a material.

Adequate product control actually depends primarily, at the present time, on secondary laboratory measurements by destructive and wasteful testing of materials, products, components and the like, which can indicate only an averaged indication of the final product condition. Obviously, only a very small percentage of the final product can be tested destructively.

Another facet of the problem of non-destructive testing, or in any testing procedure, is the proper definition of the testing objective. As a practical matter a perfect material, product, or other component is rarely if ever found. The designer and the quality control expert must establish standards in recognition of this fact. However, the test engineer defines the testing objective as the detection of any deviation from perfection, i.e., from an absolute standard. The usual test system is concerned, therefore, with detecting deviations from a theoretically perfect case rather than as deviations from an acceptable standard. In the past this problem has been alleviated to some extent by the use of standards having a visual reference, dimensional marker, etc. More recently electronic standards have been employed. To date, however, comparative inspections have made only a single use of a standard, usually for comparing some external size or surface texture or configuration.

Briefly, I have solved this problem by setting up a recognized standard in the non-destructive testing equipment of the invention, which will yield a series of acceptable and recordable readings for comparison with subsequent test objects or other materials. Identical testing arrangements can be set up in parallel, according to the invention, to provide visual comparisons, if desired, between a test specimen and a "standard" specimen. Alternatively, the standard specimen can be placed in a single testing arrangement of the invention for recordation of "standard" data for subsequent comparison, to obtain an electronic "standard." An additional feature of this aspect of the invention stems from the scanning capability of the disclosed non-destructive testing procedures. Thus, every portion of a test object can be compared stepwise with every portion of an actual standard or an electronic standard. On the other hand, particularly where uniformity is a desired characteristic, each portion of test object can be compared with another portion of itself, for example the state of cure in a given portion of the test object can be compared with a state of cure in another portion. The same applies to detection of porosity or the presence or absence of voids in general in a given test object.

Known non-destructive testing procedures involving ordinary through-transmission of testing energies do not immediately provide the information afforded by the present invention as to the depth or other location of an anomaly in the test object. The novel testing procedures of the invention, however, involve imparting a controlled series of motions to the test object such that a three-dimensional analysis and precise location of an anomaly within the test object is afforded through proper data processing. The latter feature of the invention is unexpectedly cooperative with the scanning and segmented receiver aspects of the invention discussed previously. The segmented receiver of the invention unexpectedly permits viewing the anomaly from slightly differing angles while the scanning arrangement of the invention can be repeated to provide the aforementioned multiple "exposure." All of these aspects of the invention cooperate in turn with the sensing of a very small anomaly with respect to wave length to provide a practical detection and location of very small defects in the test object. Ancillary to this feature of the invention is the provision and the disclosed testing arrangement for a zoom type motion of the test object to facilitate identification and location of the anomaly. For this purpose, a particular energy envelope configuration has been found to be advantageous.

A principal feature of the invention is the provision of a movable reflector structure having incremental reflective means thereon for scanning an intercepted area of an energy envelope. In effect this provides one form of segmented receiver arrangement, which is basic to the disclosed testing arrangements. The reflector structure can be moved repetitively along a predetermined path, as by multiple revolutions of a rotatably mounted reflector support for repeated scanning of an envelope projection containing a "shadow" of the test specimen. Although a cylindrical reflector support is illustrated herein, the teachings of the invention can readily be applied to a properly configured plate, for example, which can be reciprocated to provide scanning of an envelope projection thereon.

The invention also provides non-destructive testing procedures utilizing a combination of inspectional energies from plural sources at angles to one another and directed to a common test object in accordance with the invention. The aforementioned sources, in accordance with still another feature of the invention, can be capable of emitting the energies of different characters, for example a combination of angularly disposed ultrasonic and microwave sources or of microwave and x-ray sources. The same of differing electronic standards can be respectively associated with receiver arrangements for these angularly displaced sources. Two pairs of crossed sources can be arranged, as provided unexpectedly by the invention, for the simultaneous inspection of a pair of specimens, one of which can be an actual "standard."

The use of microwave testing in conjunction with ultrasonics, particularly low frequency ultrasonics, is a very desirable but unexpected combination of the invention. These energies tend to complement one another in that ultrasonic energy is sensitive to laminar conditions while microwave energy is sensitive to density changes, in the search for intra part or subsurface. anomalies. Moreover, in the case of elastomer curing, research has indicated that ultrasonic energy tends to respond to overcure, while microwave energy is relatively insensitive to this condition. It is hypothesized that ultrasonics correlates to average molecule size while microwaves correlates to "free end" density. The respective "shadows" produced by these energies are variably effected by cross linking during cure and by increase in number of molecules during degradation.

The testing of metal-non-metal assemblies are of interest to this feature of the invention. Ultrasonic energy penetrates the metal component with greater facility, while microwave energy will penetrate the non metal component.

Other known non-destructive testing systems have been developed for determining heat treat condition in small items, using eddy current methods, or for determining grain size measurements using an ultrasonic measurement of acoustic velocity in the material. However, metal properties are still largely controlled through destructive, tensile testing of coupons or the like. In the field of non-metallic testing surface hardness measurements such as Shore durometer, can only result in gross judgements, as non-metals are rarely uniform throughout.

The non-destructive testing procedures of the invention unexpectedly afford a number of advantages. The disclosed procedures, for example, provide an excellent resolution capability irrespective of size of the anomaly. Other features of the invention provide a zoom capability permitting a continuous increase in magnification of a local area of the test object for detailed inspection of a questionable area. Lower frequency sources (long wave) can be utilized by the disclosed testing procedures with superior resolution while permitting greater penetration ability. In the case of ultrasonics, liquid couplants can be eliminated in most applications. The geometry of the disclosed system can be readily adapted for several optical type source-receiver systems, e.g. high frequency ultrasonics, low frequency ultrasonics, and x-band microwaves. In particular, the use of low frequency ultrasonics permits all materials to be tested with high resolution capability. Detection of progressively larger differences in physical properties is made possible by the invention with respect to comparisons between a test object and a "standard" object, between differing scan areas within the single test object, or between differing portions within a local test area of the test object.

The non-destructive testing arrangement of the invention are emminently versatile, and inspection of complex shapes with the same accuracy and ease as simple shapes is permitted. A wide range of materials can be inspected, along with the wide range of sizes and shapes of test objects. Flows, defects, foreign occlusions, and other anomalies can be detected together with inspection of internal physical properties, without loss of resolution in any case. As evident from the following detailed description, the testing arrangements of the invention can be set up simply and easily, and readily calibrated. Deviations from an acceptable actual or electronic standard can be indicated readily in avoidance of a theoretically "perfect" reference. Even "defective" but acceptable standards can be used directly in the disclosed testing arrangements.

Source-receiver variations can be cancelled out through use of a set-up procedure employing two standard parts. The disclosed testing arrangements can be varied readily to obtain a given precision of anomaly location and size. Adaptations to combine types of energy sources can be readily made. The size of system components can be varied readily depending upon the anticipated sizes of test objects.

The invention has been considered in conjunction with the following U. S. patents which would appear to be representative of the prior art on this subject:

| O'Connor et. al. | 3,548,644 | Bacon | 3,028,752 |
|---|---|---|---|
| Phelan | 3,534,591 | Carlin | 2,932,189 |
| Silverman | 3,461,420 | Morris | 2,378,237 |
| Colgate | 3,402,598 | Carson | 2,700,895 |
| Wendt et al. | 3,373,602 | Valkenburg et al. | 2,787,158 |
| Wood et al. | 3,322,278 | Sheldon | 3,013,170 |
| Wood et al. | 3,295,362 | Drake | 2,628,335 |
| Joy | 3,166,731 | Renaut | 2,862,384 |
| Steinbaecher | 3,159,023 | Renaut | 3,163,784 |
| McClure | 3,197,521 | Pear | 3,379,060 |
| Hitt | 3,048,338 | Schwartz | 3,410,363 |
| Renaut | 3,052,155 | Weighart | 3,555,889 |

None of these references nor any combination thereof discloses, teaches or implies the unique combinations and unexpected results of the invention as set forth above.

During the foregoing discussion, various objects, features and advantages of the invention have been set forth. These and other objects, features and advantages of the invention together with structural details thereof will be elaborated upon during the forthcoming description of certain presently preferred embodiments of the invention and presently preferred methods of practicing the same.

In the accompanying drawings I have shown certain presently preferred embodiments of the invention and have illustrated certain presently preferred methods of practicing the same wherein:

FIG. 6A also shows use of condensing lens.

FIG. 8 is a side elevational view of a modified form of rotating reflector structure as adapted for use in a testing arrangement for a pair of specimens.

FIG. 10 is an end elevational view of the apparatus as shown in FIG. 8.

Figure 1:
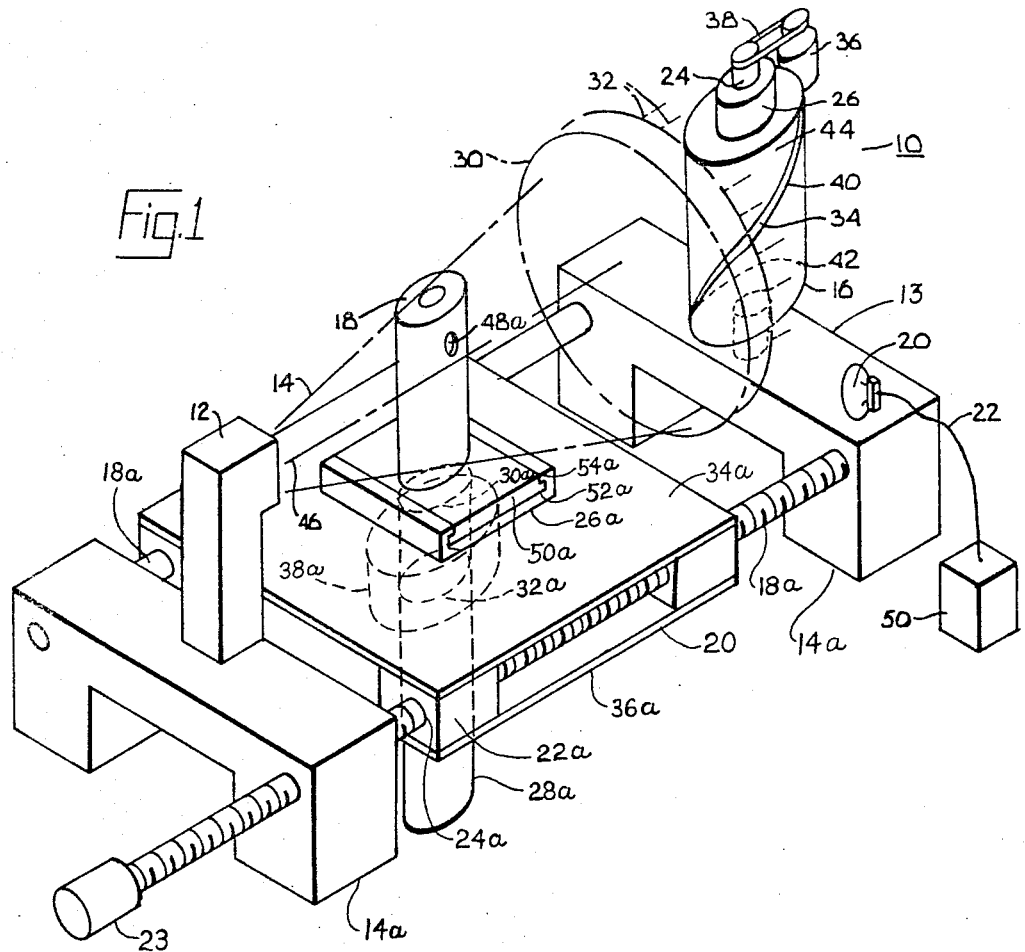
FIG. 1 is an isometric view of one form of non-destructive testing arrangements of the invention.

Referring now more particularly to FIG. 1, of the drawings the exemplary testing arrangement 10 shown therein comprises a source of penetrative energy 12 capable of emitting in this example an energy envelope 14 from substantially a line or point source. Desirably but not necessarily the energy envelope 14 is relatively flat, (as in FIGS. 2 or 6 for example) i.e., it expands substantially in only a single transverse direction. Alternatively, energy sources which produce an envelope expanding in all directions, i.e. a conical envelope, can be substituted along with a suitable collimating slot structure (not shown). The vast majority of ultrasonic and microwave sources can readily be configured or shaped by known techniques to emit a desired envelope configuration.

The source 12 cooperates with the rotating reflector 16 described below and therefore must be capable of emitting an envelope of reflectable energy. For an ultrasonics system, a suitable source 12 can be obtained from Branson Instruments Inc. of Standord, Connecticut, Sonoray T.M. Series 600. For a microwave system a source 12 can be obtained from PRD Electronics, Inc. of Westbury, New York, model No. PRD-L-712B.

Positioned intermediate of the spaced source 12 and reflector 16 is a test specimen 18. The source 12 is mounted on the adjacent end of the support structure 13, while the reflector 16 is rotatably mounted on the opposite end of the support structure 13. The specimen 18 is mounted on platform 20 which is arranged for traversing movements relative to the energy envelope 14 and for imparting rotational movements to the specimen 18. The support structure includes a number of standards 14a mounted on a floor or other suitable supporting surface. Extending between each pair of standards 14a are guide means such as slide rail means 18a on which the test platform 20 desirably is slidably mounted. The test platform 20 is provided with at least one bearing block 22a, an aperture 24a of which forms a sleeve bearing for slidable engagement with an associated slide rail 18a. In the arrangement of FIG. 1, the rail means 18a include a pair of generally parallel rails, and two such bearing blocks 22a engage each slide rail 18. The test platform 20 can be moved manually along the slide rails 18a or alternatively one of the slide rails 18a can be threaded and rotatably mounted in its associated supports 14a for threaded engagement with the associated bearing blocks 22a, which can be tapped for this purpose. This can be rotated by means of motor 23. Alternatively again a piston and cylinder arrangement, rack and pinion, cable and pulley, or other mechanical linkage can be utilized for powered movement of the test platform 20.

A specimen table 26a is rotatably mounted on the platform 20, and in this case includes a threaded lead screw 28a which is inserted loosely through apertures 30a, 32a in upper and lower plates 34a, 36a of the platform 20. The lead screw 28a and turntable 26a are supported on the bottom plate 36a of the platform 20 by means of drive gear 38a having a central threaded aperture enmeshed with the lead screw 28a. The drive gear 38a is driven by means of a reversible motor (not shown) through an output pinion or other suitable linkage to raise and lower the specimen turntable 26a.

A test specimen or object 18, which may have an anomaly 48a therein, is mounted on the turntable 26a. Desirably the specimen 18 is supported on a specimen holder 50 a which is slidably mounted on the turntable 26a and provided with lateral flanges 52a. A pair of angle members 54a are spacedly mounted on the turntable for complementary engagement with the holder flanges 52a to retain the holder on the turntable. When positioned as shown the slidable holder 50a permits transverse adjustments of the test specimen 18 relative to the slide rails 18a. When the turntable 26a is rotated to a position normal to that shown the slidable holder 50a then permits fine positional adjustments of the test specimen 18 longitudinally of the slide rails 18a.

The platform 20 and rails 18a can impart a series of motions to the specimen 18 for a complete inspection thereof, as described in my aforesaid application Ser. No. 162,510. This is advantageous where large specimens are inspected. However, such motions are not essential to the movable reflector arrangements disclosed herein.

Mounted adjacent the opposite end of the supporting structure 13 of the testing apparatus 10 is a receiver assembly including in this example a movable reflector, in this case a generally cylindrical member 16 rotatably mounted on the supporting structure 13. A single receiving unit 20 in this example is stationarily mounted on the supporting structure 13. the receiver 20 thus formed is capable of transducing the energy emitted by the source 13 into a suitable electrical signal on conductor 22. When an ultrasonics source 12 is employed, a suitable receiver 20 is available from Branson Instruments, Inc., of Stanford, Connecticut, catalog No. 2-103-B. When a microwaves source 12 is employed a suitable receiver 20 is available from PRD Electronics, Inc., of Westbury, New York, catalog Nos. PRD 6301 (bolometer) and PRD 6608 (bolometer mount).

As noted previously, the reflector 16 can be rotatably mounted on the supporting structure 13 and for this purpose is provided with a drive shaft 24 and sleeve bearings 26, 28. The length of the cylindrical reflector 16 desirably is about equal to the width of the energy envelope 14 as projected on or intercepted by the reflector 16.

Desirably but not necessarily, a condensing lens 30 can be interposed between the test specimen 18 and the reflector 16 to change the expanding energy envelope 14 to a parallel-ray projection as denoted by chain lines 32. This arrangement improves the accuracy somewhat of the aforementioned receiver assembly, and facilitates construction of reflective means such as reflective surfaces 34, which is formed upon the rotatable cylinder 16. The rotatable cylinder 16 can be driven by suitable drive means such as electric motor 36 and belt and pulley arrangement 38 cooperatively mounted on the drive shaft 24 of the reflector 16 and on an output shaft of the motor 36.

In the testing arrangement 10 of the invention, the reflective surface 34 is provided in the form of a spiral rib 40 which substantially surrounds the cylinder 16 in the circumferential direction and which extends to both ends thereof, as illustrated in FIG. 1. In this example, the spiral rib 40 is defined by undercutting that surface 42 of the cylinder 16 which extends below the reflective surface 34. At the spiral rib 40 the junction between overhanging upper cylindrical surface 44 and the aforementioned undercut lower surface 42 is bridged by a spiral band forming the reflective surface 34 which is disposed desirably at an angle of about 45° relative to center line 46 of the energy envelope 14. More particularly, the reflective surface 34 is disposed at an angle of about 45° each of the parallel energy rays 32, when the condensing lens 30 is utilized. In the case of ultrasonic energies, a suitable material for the condensing lens 30 is methacrylic resin. The lens 30 can be fabricated from the same material for use in a microwave inspectional system arranged accordingly to FIG. 1. Similarly the same reflective materials can be used in microwave systems.

The aforementioned particular 45° disposition of the reflective surface 34 is based on the assumption that the receiver or single transducer 20 is disposed axially of the reflector cylinder 16 as shown in FIG. 1, i.e., at an angle of about 90° relative to the center line 46 of the energy envelope 14. However, the receiver 20 can be disposed at some other angle relative to the center line 46, which would of course deviate from the axial direction relative to the cylinder 16. In such case the angular disposition of the reflective surface 34 would be other than 45°. The resolution of the receiver can be varied, within limits, by variations in the angular disposition of the reflective surface or surfaces, with corresponding repositioning of the receiver 20.

In order to improve the efficiency and resolution of the testing arrangement 10 the receiver 20 can be made quite small with respect to the total area of the energy envelope 14 falling upon the reflector cylinder 16. Desirably the size of the receiver 20 is about equivalent to a projection of a width and incremental length of the reflective surface 34. The incremental length would of course be determined by that length of the reflective spiral 40 which subtends the intersection of the energy envelope 14 with the cylinder 16. Such subtending length can be reduced further by the use of a collimating slot structure (not shown). The receiver 20 therefor is unusually small relative to an anomaly 48 that may be present in the test specimen 18. Accordingly, the use of a relatively small receiver 20 permits a very small anomaly 48 to be "seen" by the inspectional apparatus 10, in contrast to known non-destructive testing apparatus, as described previously and in my copending application Ser. No. 162,510. The small receiver 20 in fact is thus rendered sufficiently sensitive to sense the "wrap around" effects and other ultra-wave purturbations of relatively long wave length penetrative energies such as low frequency ultrasonics and x-band microwaves.

The spiral rib 40, the angular disposition of the reflective surface 34 and the exact location of the receiver 20 are each orientated such that an increment of the intersecting area of the envelope 14 at the cylinder 16 properly falls upon the active surface on the receiver 20 irrespective of whether the reflective increment occurred at the top or bottom or some location therebetween in the aforementioned intersecting envelope area.

In the operation of the testing apparatus the specimen platform 20 can be actuated as described previously to bring successive portions or areas of the specimen 18 successively within the energy envelope 14 such that the specimen 18 can be rough-scanned portion by portion or area by area. As noted elsewhere the specimen can be rotated at each of these successive positions to give a rough depth or subsurface location of an anomaly 48 when within the intersection of the envelope 14 with the test specimen 18, and to corroborate the presence of an anomaly from a 180° location or some other angular disposition.

At each position of the test specimen 18 relative to the envelope 14 (a series of such locations can be employed for each inspectional cycle as outlined more particularly in my copending application Ser. No. 162,510, the reflector cylinder 16 is rotated to provide a fine scan of the test envelope 14 and shadow of the test specimen 18 falling upon the cylinder 16. In furtherance of this purpose an over hung cylinder area 44 and the undercut cylinder area 42 are made of nonreflecting materials relative to the specific penetrative energy utilized. For ultrasonics, the areas 42, 44 can be made from lead while for microwave applications these areas can be made from any non-metal. On the other hand a material having good reflective capabilities is applied to the reflector rib 40, such as a polished strip of aluminum or steel. Alternatively, the cylinder 16 can be fabricated in toto from aluminum, steel or other good reflective material, the reflective surface 34 polished, and the areas 42, 44 coated with lead or rubber material.

Upon rotation of the reflector cylinder 16 the test object 18, or rather the portion thereof within the confines of the energy envelope 14, is scanned completely from top to bottom (as viewed in FIG. 1) for each revolution of the cylinder 16 (or analogous movement of another shape of reflector member). Of course, if the spiral or angularly disposed reflector 34 is extended only part way around the circumference of the cylinder 16, as shown in later figures of the drawings, then the scan would be repeated from top to bottom in less than a revolution of the reflector. Of course, if the rotational direction of the cylinder be reversed, the test objects 18, or more properly its shadow on the cylinder 16, would be scanned in the opposite direction. Assuming that the aforementioned scan, effected by rotation of the reflector 16, is from top to bottom of the energy envelope 14, the receiver 20, then "sees" a decending series of increments of the reflective surface 34, as successive portions of the latter enter and leave the energy envelope 14 during revolution of the cylinder 16.

The scan effected by the receiver assembly including the reflector 16 and the receiver 20 can be carried out independently of any movement or series of movement imparted to the test specimen 18. When inspecting small objects which can be fitted substantially within the energy envelope 14, or at least that part thereof which is of interest to the inspectional procedure, the test specimen need not be moved at all. On the other hand, the test specimen can be moved toward the reflector 16, and lens 30 if used, to increase the sensitivity of the receiving arrangement or alternatively toward the source 12 to increase the magnification of the testing arrangement. A suitable programming arrangement (not shown) can be provided for imparting a predetermined series of motions to the specimen 18 by operation of the several components of the specimen table 20. Such cycle of movement can be coordinated with intermittent or continuous rotation of the cylinder 16 and with the signals generated by the receiver 20 to provide a fine scanning of the test object at each of these positions, as desired.

Use of the rotating receiver reflector 16 is advantageous in further increasing the efficiency and resolution of the receiver assembly, as the cylinder can be rotated through several revolutions to provide multiple scanning of the test object 18 at a single position thereof. Multiple scanning not only provides facile corroboration of any defects indicated by a previous scan but in addition greatly enhances the signal to noise ratio of the receiver 20 and associated data analyzing circuitry denoted generally at 50. The circuitry 50 is conventional in nature and need not be elaborated upon further.

Figure 1A:
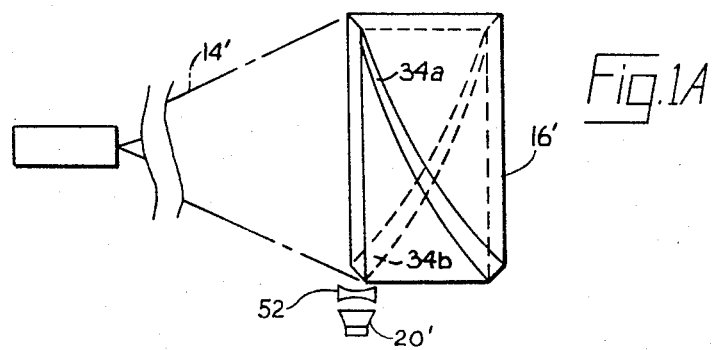
FIG. 1A is an elevational view of a modified form of testing apparatus similar to that shown in FIG. 1 and showing another form of the rotating reflector.

A modified form of the rotating receiver reflector 16' is shown in FIG. 1A. In this arrangement a pair of reflective surfaces 34a, 34b are provided on the reflector with each surface forming a spiral extending about halfway around the circumference of the cylinder 16'. The reflective surfaces 34a, 34b can be formed on the cylinder 16' as noted above with respect to the reflective surface 34. As in the case of the reflective surface 34, the surfaces 34a, 34b need not conform precisely to a true spiral configuration as long as they are angularly disposed on the cylinder 16 or 16' relative to the area of impingment of the energy envelope 14 or 14' or of a transmitted portion thereof if a collimating slot structure (not shown) is used.

FIG. 1A also demonstrates the use of a condensing lens 52 disposed intermediate the receiver 20' and that portion or the reflective surface 34a or 34b which is juxtaposed to the energy envelope 14'. The condensing lens 52 permits the use of a receiver 20' which is correspondingly smaller than that incremental area of the reflector surface 34a or 34b which is momentarily disposed within the energy envelope 14', and thereby further increasees the sensitivity and resolution of the system.

Figure 2:
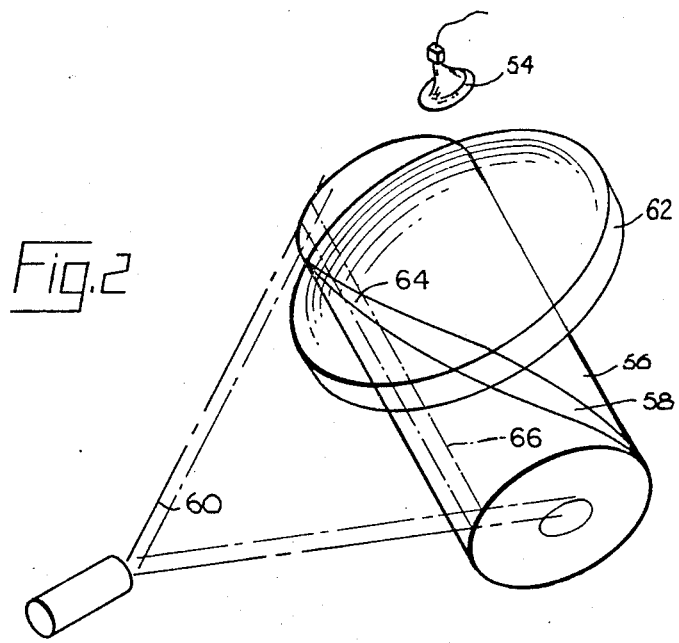
FIG. 2 is an isometric view of a modified form of the testing arrangement shown in FIG. 1.

A somewhat similar arrangement is shown in FIG. 2 wherein a relatively small receiver 54 is disposed substantially tangentially of rotatable reflector 56 rather than axially thereof as in the preceding figures. The reflector 56 is provided with a reflector surface 58 which is angularly disposed relative to the projection or intersection of energy envelope 60 impinging thereon. A condensing lens 62 is interposed between the reflector 56 and the receiver 54 and is configured such that an entire image, as it were, of the reflector 56 or at least that portion thereof which intersects the envelope 60 is concentrated and focused on the relatively small receiver 54. Although the entire area of the reflector 56 which is intersected by the energy envelope 60 is reflected onto the much smaller receiver 54, in actuality, only a very small but changing increment 64 of the intersected area of the energy envelope 60 is so projected or focused. The instantaneous reflected increment 64 is, of course, determined by that portion of the relatively narrow reflective strip 58 which falls within the intercepted envelope area 66. Upon further angular displacement of the reflector 56 the increment 64 moves along the length of the intercepted envelope area 66, as explained previously in connection with FIG. 1. If desired, a second reflective strip (not shown) can be mounted on the cylinder or reflector 56 such that a second reflective increment falls within the area 66 either simultaneously or tandemly. With the arrangement shown, however, the projected area 66 of the envelope 60 and the shadow of the test specimen container therein is scanned completely with each revolution of the reflector 56.

With the lens arrangement 62, and considering the aforementioned disposition thereof relative to the receiver 54, an increment of the reflective strip 58 is focused upon the active surface receiver 54 irrespective of its instantenous location along the length of the envelope area 66.

Figure 3:
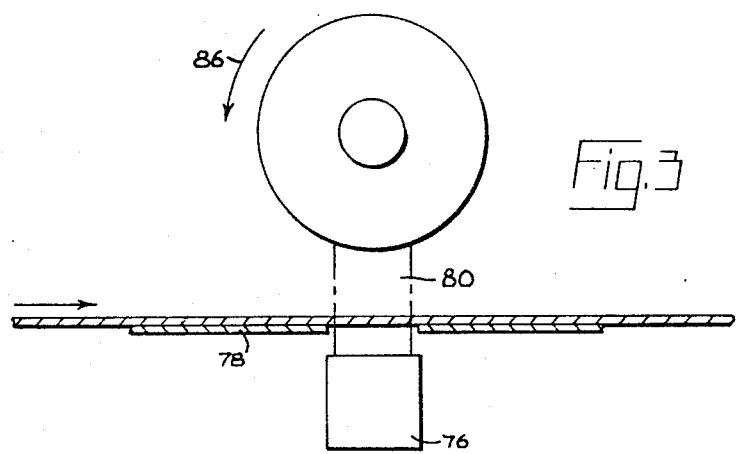
FIG. 3 is a further modification of the testing arrangement shown in the preceding figures and adapted for inspecting a moving sheet member.
Figure 3A:
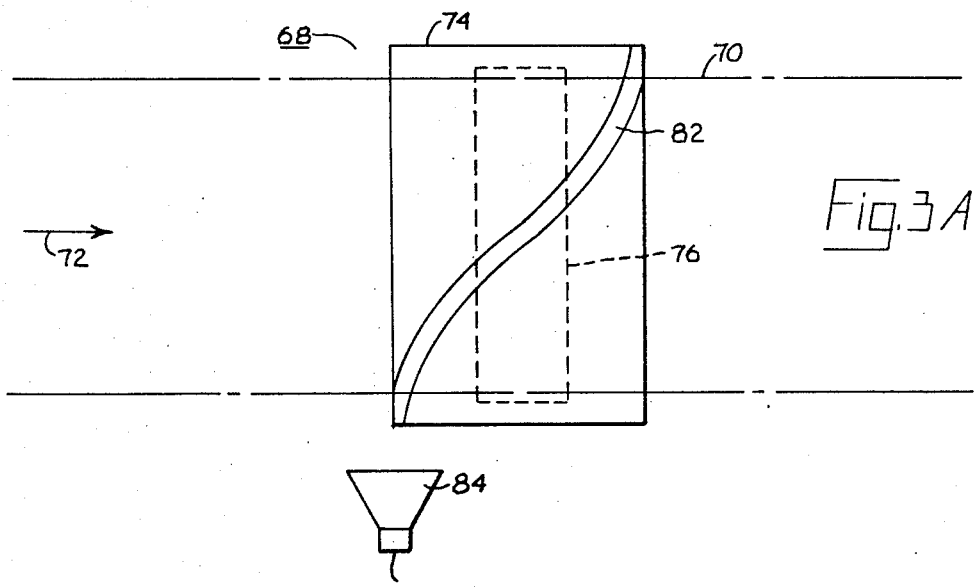
FIG. 3A is a top plan view of the apparatus as shown in FIG. 3.

Referring now to FIGS. 3, 3A of the drawings, a nondestructive testing arrangement 68, similar to that shown in FIG. 1, is adpated for use with a continuously moving member 70, such as steel sheet or strip, or various types of web materials. The strip 270, which may move in a direction noted by arrow 72, is passed between a rotating receiver reflector 74 and a collimated or slot type source 76 of penetrative energy. The source, as is shown generally at 76, can be a single transducer capable of emitting an energy envelope across the width of the moving member or sheet 70 or, alternatively, a series of closely spaced energy sources. A substantially planar beam of penetrative energy is defined by slot structure 78, through which an energy envelope 80 is directed, in this case, substantially normal to the moving member or sheet 72.

As in the preceding figures the source 76 is capable of emitting a reflectable penetratable energy such as ultrasonics or microwaves. In the several embodiments of the invention, as disclosed herein, use of low frequency ultrasonics generally is preferred in avoidance of a liquid couplant and the turbulence problems which would be caused therein by a moving component. In the arrangement of FIG. 3 these problems would be aggravated still further by the presence of the moving sheet or web 70.

The rotating receiving reflector 74 is provided with reflecting ribs or surfaces 82, desirably after the manner of the reflector construction of FIG. 1 or 1A. A relatively small receiver 84 is positioned axially of the reflector 74 in order to receive portions of the impinging energy, as reflected from increments of the reflective surface 82, in the manner described previously.

Desirably the reflector 74 is rotated in the direction denoted by arrow 86 (FIG. 3) so that the lower surfaces of the reflector cylinder are moving in a direction generally opposite to that of the sheet or web 70. The speed of reflector rotation can be synchronized with that of the sheet or web 70 such that each rib 82 reflects a series of incremental shadows of the sheet or web from a narrow band extending substantially normal to the path of strip or web movement.

Figure 4:
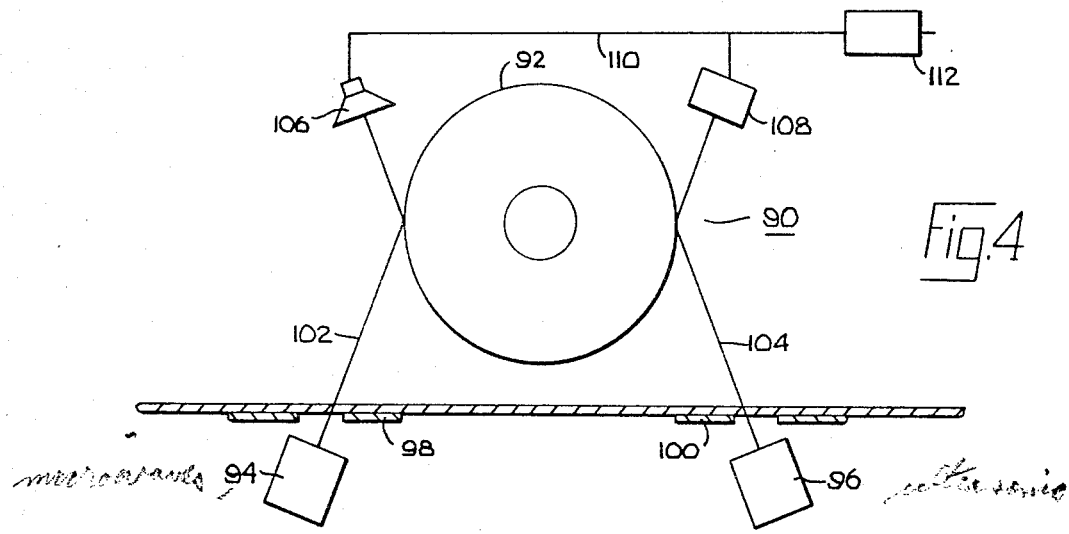
FIG. 4 is an elevational view of another testing arrangement of the invention likewise adapted for inspecting a moving sheet member.

A modified form of sheet-inspecting testing apparatus 90 is shown in FIG. 4 of the drawings. The apparatus 90 likewise employs a rotating receiver reflector 92 to which a pair of sources 94, 96 are related, each of which is provided with a slot structure 90 or 100 for the purposed described previously in connection with FIGS. 3 and 3A. The testing apparatus 90 is particularly advantageous for use in inspecting nonmetallic sheets or webs. For this purpose the source 94 is capable of emitting microwaves preferably in the x-band frequencies and is shaped to emit a planar wave envelope 102 as defined by the slot structure 98. A suitable source 94 for this purpose is available as mentioned previously in connection with FIG. 1.

On the other hand the source 96 is capable in this example of emitting relatively low frequency ultrasonic wave and is similar to the source employed in the arrangement of FIGS. 3, 3A. A planar envelope of ultrasonic energy 104, emitted from the source 96, is directed, along with microwave envelope 102, tangentially of the rotating receiver reflector 92. The reflector 92 for this purpose is provided with two strip or series of reflecting increments positioned to direct increments of the envelope projections as intercepted by the reflector cylinder 92, to a microwave receiver or antenna 106 and an ultrasonics receiving transducer 108 respectively. For purposes noted previously the active areas of the receivers 106, 108 are relatively small relative to the envelope portions intercepted by the reflector 92 but are of the same order of size as the increments reflected respectively by the cylinder 92. A desirable form of reflector 92 for this purpose can be structured after the manner of FIGS. 8–10 described below. The electrical signal outputs of the receivers 106, 108 are conducted along conductor system 110 to data analyzing circuitry of conventional design denoted generally by reference character 112.

As explained in my copending application Ser. No. 162,510 microwaves and ultrasonics respond to differing non-metal properties and therefore expand the inspectional capabilities of the testing system 90.

The aforesaid application also sets forth the advantages of non-destructive testing systems, in general, as arranged for the simultaneous inspection of a test specimen along with an actual standard. One form of such testing arrangement 114 utilizing movable reflector means is shown in FIG. 5 of the drawings which is particularly useful for inspecting a pair of tubular or rod like members or other elongated specimens 116, 118. The test object such as the specimen 116 and the standard such as the specimen 118 desirably are rotatably mounted as shown so as to lie substantially within energy envelopes 102, 122, respectively, emitted by sources 124, 126. The sources desirably are configured such as explained previously in connection with FIGS. 1, 1A, 1B for emitting a substantially flat envelopes from a point or line source. The sources 124, 126 for example can each be similar to that described in connection with FIG. 1 when testing with ultrasonics. Alternatively microwave sources can be substituted along with an antenna type receiver for receiver 128. Otherwise, the receiver 128 can be provided with a pair of relatively small, active surfaces 130, 132 for receiving reflected envelope projectional increments from movable reflectors 134, 136 respectively. Each of the movable reflectors 134, 136 is provided with a reflecting strip or band 138 which is positioned angularly with respect to the intercepted area of the related energy envelope 120 or 122, and is further orientated to reflect microwaves, ultrasonics or other penetrative energy from an increment thereof within the corresponding envelope area to the appropriate receiver surface 130 or 132. Each receiver surface desirably is of the same order of size as that of the reflecting segment or increment for the reasons noted previously. Alternatively, the receiver 128 can be replaced with a pair of back to back receivers (not shown) having active areas of similar size. Signals developed by the receiver arrangement 128 are supplied on conductors 140 to a compartor and data analyzer denoted generally at 142.

The rotatable mountings for the elongated specimens 116, 118 can be slaved together for common rotation by a belt and pulley system denoted generally by the reference character 144. Similarly the rotatable reflectors 134, 136 can be interconnected by belt and pulley system 146. A single drive means for example electric motor 148 can be belted to adjacent ones of the specimens and rotatable cylinders as shown. Pulleys of differing sizes can be used as appropriate where it is desired to rotate the reflectors 134, 136 at speeds differing from the rotational speed of the specimens. Alternatively, the specimens 116, 118 can be maintained in stationary positions. Alternatively again, suitable specimen platforms capable of imparting a series of compound scanning motions (in addition to the line scan provided by the rotating reflectors 134, 136 and the common receiver assembly 128) can be provided for the specimens 116, 118.

Figure 5A:
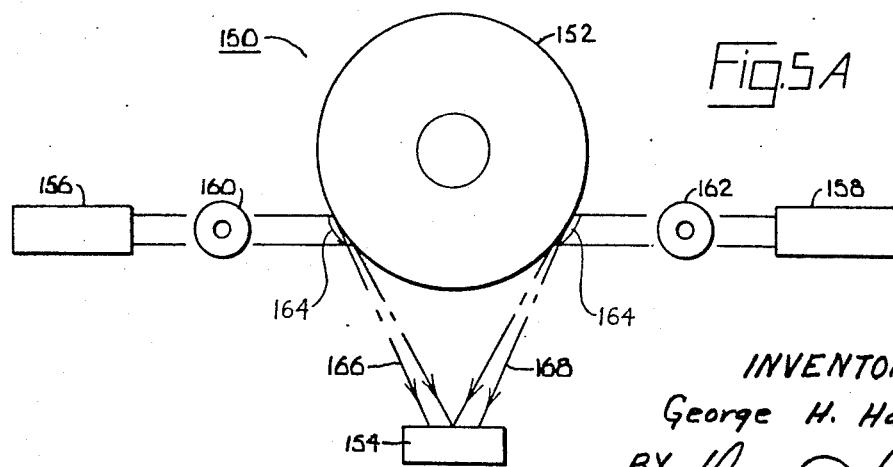
FIG. 5A is a top plan view of still another testing arrangement of the invention adapted for inspecting a pair of specimens.

As shown schematically in FIG. 5A, a comparative testing arrangement 150 can be formulated according to the invention using a single rotating reflector 152, a single receiver 154 having a single active surface, and a pair of preferably identical sources 156, 158. A test specimen 160 and a standard specimen 162 are located between the oppositely disposed sources 156, 158 and the reflector 152 respectively. The rotating receiving reflector 152 desirably is centered between the sources 156, 158, which, however, are offset from a transverse axis of the reflector 152 for the reason noted below. The reflector 152 can be cylindrical in shape and the sources 156, 158 are capable of emitting substantially flat envelopes as described previously. The specimens 160, 162 desirably are located equal equidistantly from the juxtaposed cylindrical surfaces of the reflector 152.

The reflector member 152 is provided with a pair of reflector strips 164 which are disposed to reflect successive segments of the intersecting envelope areas to the single receiver 154, as denoted by arrows 166, 168 respectively.

With the arrangement of FIG. 5A a direct comparison of the test specimen 160 to the standard specimen 162, or vice versa, can be made by adding, in the single receiver 154, the signals corresponding to the reflected energy increments 166, 168. Preferably, however, these signals can be subtracted by circuitry associated with the receiver 154 to indicate deviation of the test specimen 160 from the standard specimen 162.

Figure 5B:
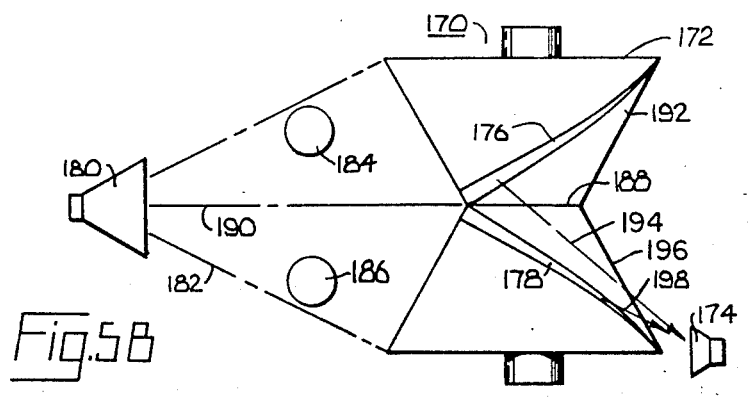
FIG. 5B is a modified form of the testing arrangement of FIG. 5 as adapted for use with a different form of penetrative energy.
Figure 5:
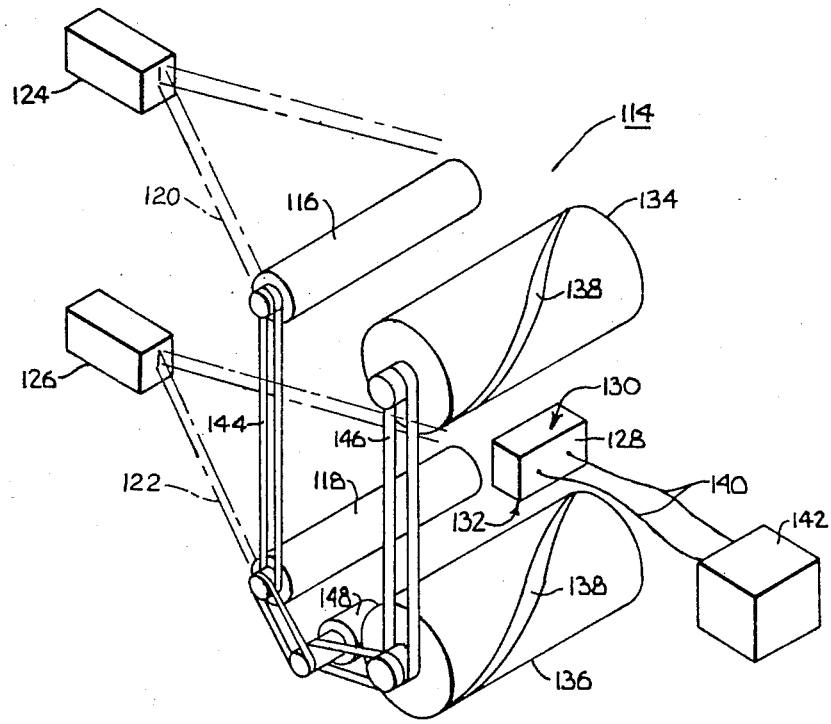
FIG. 5 is a top plan view of another testing arrangement of the invention adapted for measuring a pair of test specimens.

A similar comparative test arrangement 170 utilizing a single rotating reflector 172 and a single receiver 174 adapted for use with microwaves is shown in FIG. 5B. The single receiver 174 therefore is of the antenna variety, which concentrates or focuses the received energy as is well known. Accordingly, the active receiver area is quite small and is consanant with incremental areas reflected by the reflective strips 176 and 178. A single source or microwave horn 180 can be employed in the testing arrangement 170. The microwave source 180 can have a relatively flat envelope 182, which is desirably divergent in one transverse direction. A suitable microwave source is available as noted above.

A pair of test specimens 184, 186 are interposed between the single source 180 and the single rotating reflector 172. Specimens 184, 186, one of which can be a test specimen and the other a standard specimen, desirably are supported side by side so as to be equidistant from the source 180 and from the reflector 172.

In this arrangement the rotatable reflector 172 is of double frustoconical configuration, and is orientated with respect to the source 180 such that waist line 188 of the reflector 172 is disposed substantially on centerline 190 of the source 180 and energy envelope 182. An upper frustoconical section 192 of the reflector 172 contains the aforementioned reflective strip 176 which is so orientated relative to the energy envelope 182 and the shadow of the upper specimen 184 that reflector increments are directed to the single receiver 174 as denoted by arrow 194. By the same token a lower frustoconical section 196 of the reflector 172 and reflective strip 178 similarly orientated relative to the energy envelope 182, the lower specimen 186, and the single receiver 174, as denoted by arrow 198.

In the testing arrangement 170 of FIG. 5B, it will be appreciated that an ultrasonic source (not shown) and receiver therefor can be substituted for the microwave source 180 and receiver 174. The doubly frustoconical surfaces of the reflector 172 can be replaced with smoothly curving concave surfaces merging at the waist 188 of the reflector and having a radius of curvature such as to facilitate incremental reflection from the reflecting strips to the single receiver.

Figure 6:
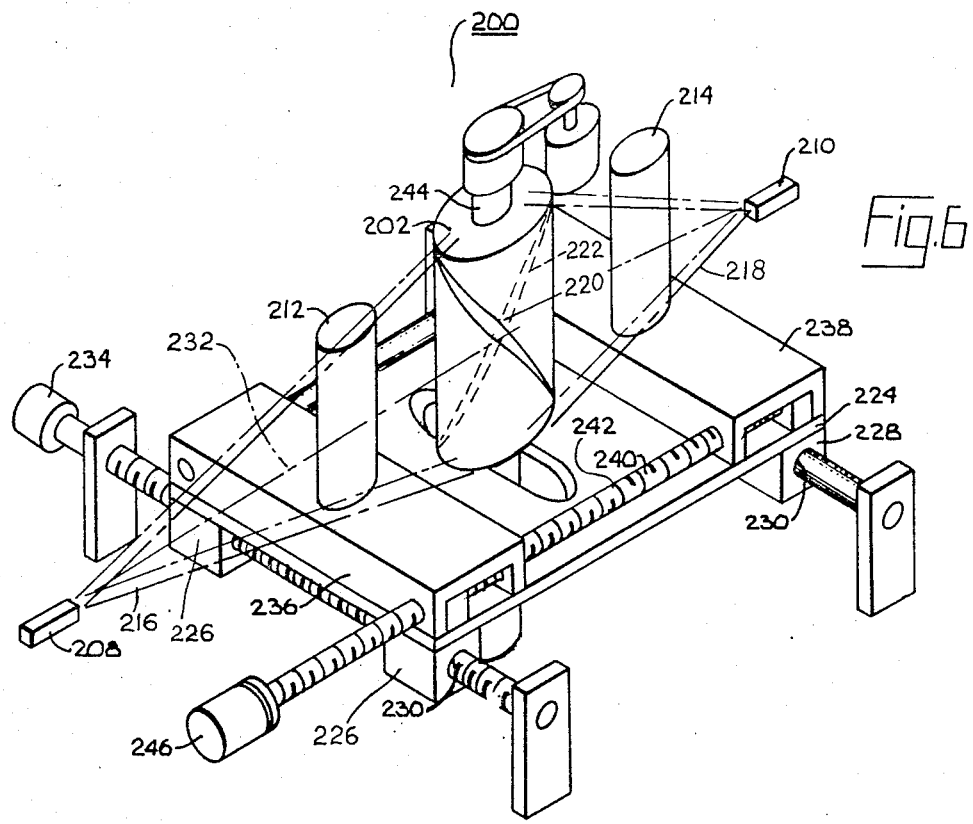
FIG. 6 is an isometric view of a further testing arrangement of the invention adapted for testing a pair of specimens simultaneously.
Figure 7:
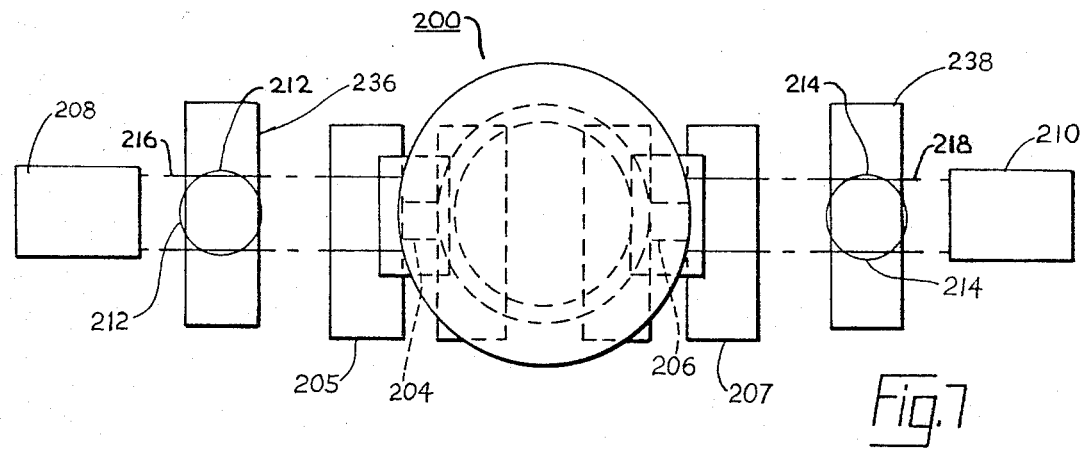
FIG. 7 is a schematic top plan view of the apparatus as shown in FIG. 6.
Figure 6A:
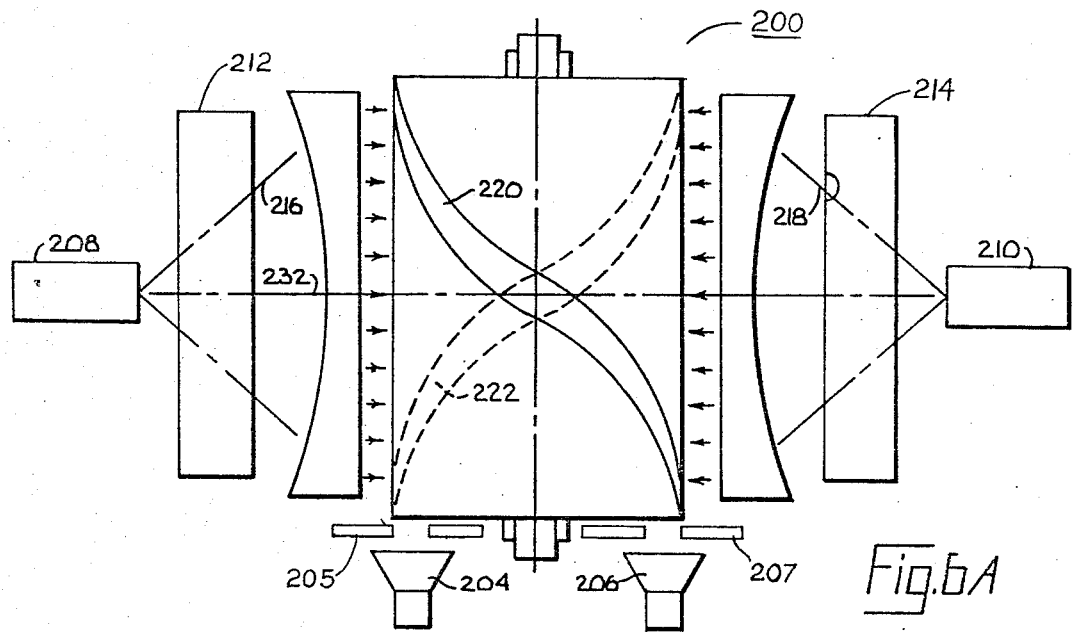
FIG. 6A is a schematic elevational view of the apparatus as shown in FIG. 6.

In FIGS. 6, 6A, 7 of the drawings another comparative non-destructive testing arrangement 200 is disclosed, as using a single rotating receiver reflector 202, a pair of axially disposed incremental receivers 204, 206, and a pair of energy sources 208, 210. In this arrangement the sources 208, 210 are diametrically and spacedly disposed relative to the cylindrical reflector 202. A standard specimen 212 and a test specimen 214 are likewise disposed at equal distances from the rotating reflector 202 to intercept energy envelopes 216, 218 of the sources 208, 210 respectively. The reflector 202 is provided with a pair of reflective spirals or other reflective strips 220, 222 which are orientated as described previously in connection with FIGS. 1, 1A for reflecting increments of the intercepted energy envelopes 216, 218 to the receivers 204, 206(FIGS. 6A & 7). A specimen table (not shown in FIGS. 6,6A,7) similar to that illustrated in FIGS. 1, 1A can be provided for each of the specimens 212, 214.

The remote locations of the standard and test specimens and of their respective sources, relative to one another minimize interference in the signals reflected to the respective receivers 204, 206. The receivers can be connected in the usual manner to a comparator and data analyzer(not shown). Collimating slot structures denoted at 205, 207 can be utilized with the receivers 204, 206 for varying the resolution thereof as desired (FIGS. 6A & 7).

Alternatively in the testing arrangement 200 of FIGS. 6,6A,7 the specimens 212 and 214 can be mounted upon a common specimen table 224. The table 224 is provided with pairs of supports 226, 228 in this example secured to the under side thereof and slidably mounted upon a pair of guide rails 230. The guide rails 230 in this arrangement extend transversely of the longitudinal and substantially common axis 232 of the energy envelopes 216,128. With both of the specimens mounted on a common table 224 the specimens can be moved simultaneously in a direction transverse to the broad sides of the envelopes 216, 218 to bring successive portions or areas of the specimens within the energy envelopes. Desirably one of the fluid rails 230 can be threaded as sownn and one of the table supports for example the support 228 can be tapped for threaded engagement therewith. Energization of a suitable drive means, such as electric motor 234, provides powered displacement of the table 224 for control from a remote location, if desired.

Each of the specimens 212, 214 is mounted upon an individual platform 236 or 238 which are slidably disposed for movement toward and away from one another in a direction substantially parallel to the common envelope axis 232. The individual tables can be driven by lead screw 240 having a mid-point 242 located desirably on rotational axis of the rotatable reflector 202. The portions of the lead screw 240 separated by its mid-point 242 are provided with lefthand and righthand threads respectively such that operation of low speed reversible motor 246 in one direction causes the individual tables 236, 238 to move toward the intervening reflector 202, and in the opposite direction causes the tables to be withdrawn toward their respective sources 208, 210. The individual tables 236, 238 can each be provided with means for elevating the associated specimens 212, 214, after the manner of FIGS. 1, 1A if desired. Manipulation of the doubly threaded lead screw 240 endows the testing arrangement 200 with a "zoom" capability relative to each of the specimens 212, 214.

Figure 9:
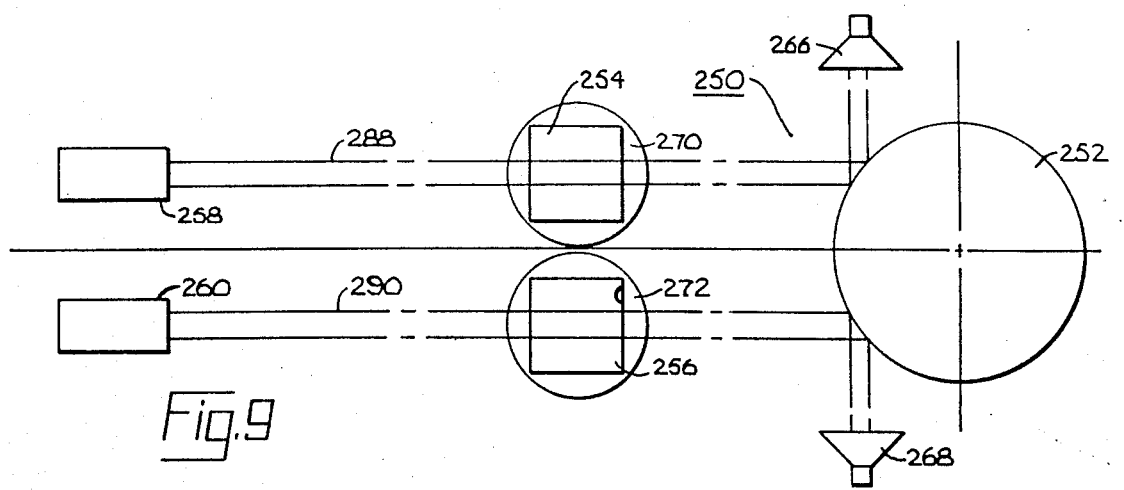
FIG. 9 is a top plan view of the apparatus as shown in FIG. 8.

Referring now to FIGS. 8–10 of the drawings, the exemplary non-destructive testing arrangements 250 shown therein incorporates a rotatable reflector 252 of a uniquely segmented or ribbed configuration. For purposes of illustration, only, the reflector 252 is designed for use with the comparative type testing arrangement 250 for inspecting a pair of specimens, for example a standard specimen 542 and a test specimen 256, with a pair of identical sources 258, 260 respectively. It will be apparent as this description proceeds that the ribbed reflector can be used in a single-specimen system with little or no change.

The reflector 252 is better shown in FIG. 8, is provided with two arrays of reflecting segments denoted generally by reference characters 262, 264. These can be arranged in spiral or helical configuration. It will be understood that a different number of arrays or reflective means or segments can be employed depending upon the specific testing arrangement in which the reflector 252 is employed. For example, the reflector 252 can be provided with a single array of segments when the reflector is employed with a single receiver for example in a testing configuration similar to FIGS. 1, 1A. A testing arrangement 250 of FIGS. 8–10 on the other hand employs a pair of receivers 266, 268 which are disposed transversely of the rotational axis of the reflector 252 rather than axially as in FIGS. 1, 1A. The receivers 266, 268 in addition are disposed oppositely relative to the reflector 252, although it is considered that the arrays of reflective segments 262, 264 can originate at the respective ends of the cylinder 252 and terminate at the mid-point of the cylinder, whereupon the receivers 266, 268 can be disposed side by side (not shown). The specimens 254 can be mounted on turntables 270, 272 which in turn can be mounted on specimen platforms similar to that illustrated in FIG. 1.

As better shown in FIG. 10 the reflector cylinder 252 is provided with a series of discrete ribs 274 each having a separate angle of inclination such that a reflective segment positioned thereon directs a corresponding segment of the respective energy envelopes impinging on the reflective cylinder 252 toward a common point, i.e., to the associated receiver 266 or 268. A pair of segments 262a, 264a are disposed on each of the circumferential ribs 274, where a pair of the segment arrays 262, 264 are utilized as shown in FIG. 8. The individual reflector segments 262a, 264a can be formed by polishing the circumferential ribs 274 after a milling operation or the like and by coating the remainder of each rib save for the reflecting segments thereon with lead or rubber to absorb the penetrative energy.

The circumferential ribs 274 are disposed at differing angles of inclination relative to the rotational axis 276 of the reflector 252 such that the respective reflective segments 262a, 264a located thereon are properly orientated relative to their respective receivers 266, 268. Thus, a central circumferential rib 274a has a vertical surface, as viewed in FIGS. 8, 10, such that the reflected energy envelope segments are directed transversely and horizontally as denoted by ray arrows 278 (FIG. 10) to the respective receivers 266, 268. On the other hand the uppermost circumferential rib 274b has a downwardly directing surface such that the reflecting segments located thereon direct reflected envelope segments downwardly and outwardly (arrows 280) to the respective receivers. Similarly the lowermost circumferential rib 274c has an upwardly directing surface such that the reflective segments thereon direct reflected envelope increments outwardly and upwardly to the receivers 266, 268 (arrows 282). The remaining circumferential ribs disposed between the uppermost rib 274b and the central rib 274a have downwardly directing surfaces of successively lesser degrees of inclination to direct reflective envelope segments of intermediate downward inclinations (arrows 284). Similarly those ribs disposed between the lowermost rib 274c and the central rib 274a have upwardly directing surfaces (arrows 286 respectively). Depending upon the specific application of the invention and the particular type or configuration of sources 258, 260 utilized each reflective segment 262a or 264a can have a horizontal width about equal to the corresponding width of the energy envelope 288 or 290 impinging upon the rotatable reflector 252.

As the reflector 252 is rotated the spiral or other angular disposition of its reflective means, i.e., the arrays of reflecting segments 262, 264 successively scan the area of the energy envelope intercepted by the circumferential surfaces of the reflector 252. The receivers, whose active areas are of the same order of size as that of the reflector segments, develop signals, corresponding to very small anomalies or to physical characteristics, which are supplied to suitable data analyzing circuitry (not shown in FIGS. 8-10). As in the preceding figure the sources 258, 260 and receivers 266, 268 can be supplied as required for either ultrasonics or microwaves applications.

Figure 11:
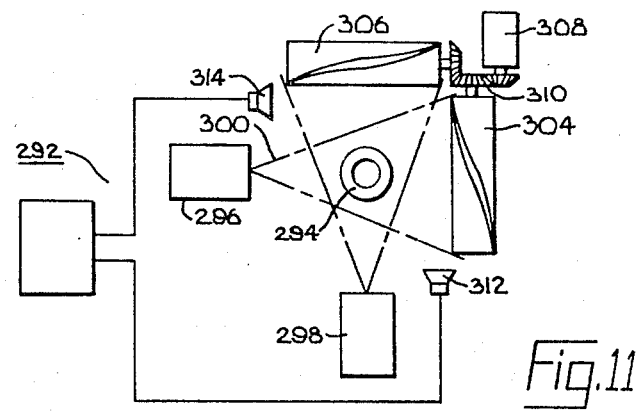
FIG. 11 is a top plan view of another testing arrangement of the invention adapted for inspecting a single specimen with a crossed pair of energy sources.

Referring now to FIG. 11 of the drawings another unexpected testing arrangement 292 of the invention is illustrated schematically therein. The testing arrangement 292 is provided with component hardware items which are described and illustrated in detail elsewhere in this specification and therefore are shown schematically in FIG. 11. The same considerations are applicable to the FIG. 12 arrangement described below.

The testing arrangement 292 is arranged for inspecting a single specimen 94 with a pair of crossed sources 296, 298 which can be disposed normally of one another or at some other angular disposition. The advantages of employing crossed sources 296, 298 have been elaborated upon during preliminary paragraphs this specification and in my aforementioned copending application Ser. No. 162,510. As noted elsewhere herein and in the aforementioned copending application, the sources 296, 298 can be identical or can be capable of emitting different forms of penetrative energies, respectively. The sources likewise can be arranged to emit differing frequencies of the same penetrative energy.

In the case of ultrasonics, the testing arrangement 292, as in the other testing arrangements disclosed herein, desirably employs a source or sources in the lower frequency ranges to avoid the turbulence problems of a liquid couplant. The specimen 294 desirably is located within an intersectional area subtending both of the energy envelopes 300, 302. A pair of rotatable reflectors 304, 306, structured as described previously, are rotatably mounted so as to intercept the associated energy envelopes 300, 302 respectively. The rotatable reflectors 304, 306 desirably are disposed equidistantly from their respective sources 296, 298. The reflectors 304, 306 can be rotated from a common drive means such as electric motor 308 operating through a gear train denoted generally by reference character 310.

A single receiver 312 or 314 cooperates with each of the rotatable reflectors 304, 306 in the manner described for example relative to FIG. 1. Alternatively, a ribbed reflector constructed after the teachings of FIGS. 8-10 (but having a single array of reflective segments) can be substituted for each of the reflectors 304, 306, in which case the receivers can be disposed transversely of the reflectors respectively rather than axially as shown in FIG. 11.

In operation, the specimen 294 is subjected to penetrative energies from both sources 296, 298, the energy envelopes 300, 302 of which are intercepted by the rotating reflectors 304, 306. Desirably the reflectors 304, 306 are similar in size and shape, and the drive and transmission means 308, 310 are arranged to rotate the reflectors 304, 306 at the speed. Differing reflector shapes and rotative speeds can be employed, however. The signals developed in the receivers 312, 314 correspond to scanning increments of the intercepted envelope areas at the reflectors 304, 306. The intercepted envelope areas, of course, contain "shadows" of the specimen 294, as "viewed" from differing angles.

Figure 12:
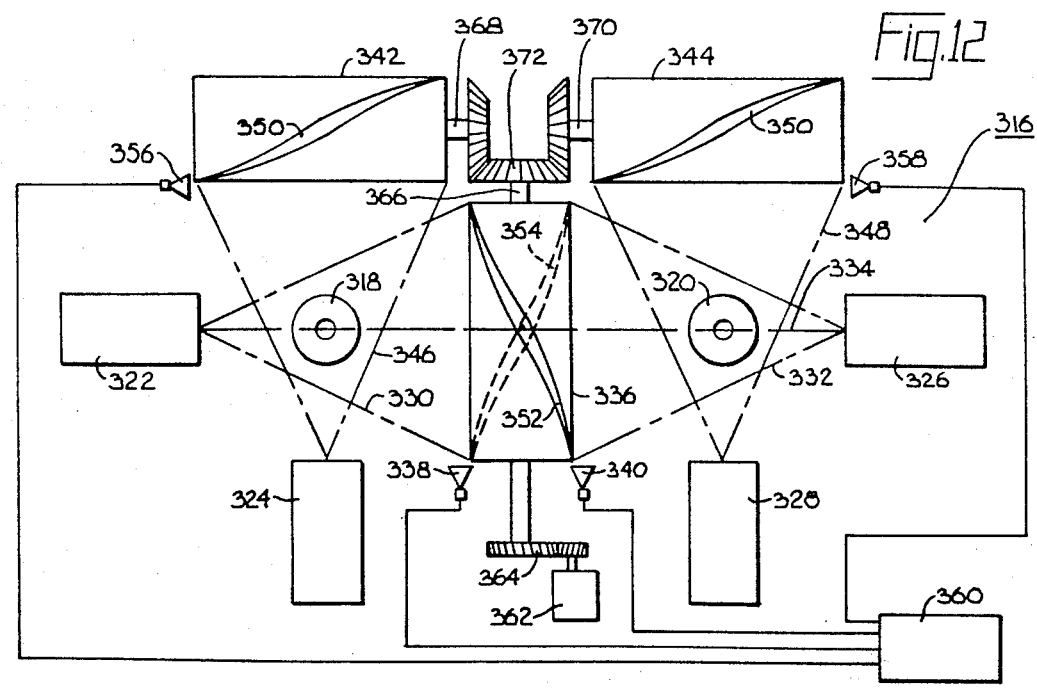
FIG. 12 is a top plan view of still another testing arrangement of the invention adapted for the simultaneous inspection of a pair of specimens.

The exemplary non-destructive arrangement 316 as shown in FIG. 12 is arranged for comparative testing of a pair of specimens for example a standard specimen 318 and a test specimen 320 with respective pairs of crossed sources 322, 324 and 326, 328 respectively. The longitudinal sources 322, 326 are positioned such that their energy envelopes 330, 332 are directed along a common axis 334 to a single rotating reflector 336 interposed therebetween so as to intercept both energy envelopes 330, 322. The reflector 336 can be structured after the manner of FIG. 1B. A pair of axially disposed receivers 338, 340 are provided in cooperation with the reflector 336 in the manner described previously. Alternatively reflective strips of 352, 354 of the reflector 336 can be replaced with angularly disposed series of reflective segments after the manner of FIGS. 8-10.

On the other hand a pair of rotatable reflectors 342, 344 are rotatably mounted so as to intercept energy envelopes 346, 348 of the transverse sources 324, 328 respectively. Each transverse reflector 342 can be structured after the manner of that shown in FIG. 1 with a single reflective strip 350. Similarly, the reflective strips 350 of the transverse reflectors 342 can be replaced with an angular or spiral row or reflective sigments after the manenr of FIGS. 8-10. A relatively small, axially disposed receiver 356 or 358 is mounted in cooperation with each transverse rotatable reflector 342 or 344. Suitable leads are provided for electrically connecting each of the receivers 338, 340, 356 358 to suitable computer or other data analyzing circuitry 360.

Various means can be provided for rotating the several reflectors 336, 342, 344 either at the same or differing speeds as required for a given application of the testing arrangement 316. In the disclosed arrangement, the transverse reflectors 342, 344 are slaved to the longitudinal reflector 336, which in turn is driven by suitable drive means such as electric motor 362 and gearing train 364 or other speed reducer. At the other end of drive shaft 366 for the longitudinal reflector 336, individual shafts 368, 370 are driven from shaft 366 through a suitable gearing train 372.

It will be understood of course that each of the specimens 318, 320 (and also the specimen 294 of FIG. 11) can be mounted for single or compound movements, for example by means of the mounting arrangement shown in FIGS. 6 and 7 or by utilizing a pair of the specimen platforms such as that shown in FIGS. 1, 1A of the drawings.

From the foregoing it will be apparent that novel and efficient forms of Non-Destructive Testing Arrangements — Movable Reflectors have been described herein. While I have shown and described certain presently preferred embodiments of the invention and have illustrated presently preferred methods of practicing the same it is to be distinctly understood that the invention is not limited thereto but may be otherwise variously embodied and practiced within the spirit and scope of the invention.

I claim:

1. A non-destructive testing arrangement comprising a source of reflectable penetrative energy, a reflector structure, means for movably mounting said reflector structure at a position such that an energy envelope of said source is substantially intercepted by said reflector structure, means for moving said reflector structure through a predetermined path, reflective means mounted on said reflector structure and disposed for reflecting successive increments of an intercepted area of said envelope, as said structure is moved along said path, a relatively small receiver for said energy juxtaposed to said reflector structure for receiving said reflected increments, said receiver having about the same order of active area as that of one of said increments, and means for positioning a specimen to be tested between said reflective structure and one of said source and said receiver so as to intercept said energy.

2. The combination according to claim 1 wherein said reflector structure includes a rotatably mounted member and means for rotating said member, means for rotating said member envelope, an array of said reflective means being arranged generally longitudinally of a rotational axis of said member but at an angle to said area so that successive increments of said reflective means pass through said area.

3. The combination according to claim 1 wherein said reflective means include at least one relatively narrow strip of a material capable of reflecting said energy.

4. The combination according to claim 1 wherein said reflective means include a series of increments of reflective material, each of said increments being oriented so as to direct an increment of said energy toward a given point transversely of said envelope, said receiver being mounted at said point.

5. The combination according to claim 1 wherein said movable member is a rotatably mounted cylinder, said reflective strip is mounted on a rib structure formed on said cylinder, said rib structure being orientated with respect to said cylinder and said energy envelope as to reflect increments thereof axially of said cylinder, and means are provided for mounting said receiver axially of said cylinder.

6. The combination according to claim 4 wherein said movable member is a rotatably mounted cylinder, a series of circumferential ribs are formed on said cylinder, each of said ribs having an angularly disposed surface, and at least one of said increments being mounted on each of said surfaces.

7. The combination according to claim 6 wherein a central one of said ribs has such angularly disposed surface that the reflective segment thereon reflect at an angle substantially normal to the rotative axis of said cylinder, and the ribs on either side of central rib have progressively steeper but opposing surface angles such that the reflected energy envelope increments thereof converge on said point.

8. The combination according to claim 1 wherein said reflective means are mounted substantially flush on said reflector structure, and a condensing lens for said energy is interposed between said reflector structure and said receiver.

9. The combination according to claim 1 wherein said specimen is mounted between said source and said reflector structure, and a condensing lens is mounted between said specimen and said reflective structure for focusing a shadow of said specimen on said reflector structure.

10. The combination according to claim 1 wherein said specimen is a moving sheet or strip or the like interposed between said reflector structure and said source, said source and said reflective structure being elongated in substantial conformance with the width of said strip, and a collimating slot structure is interposed between said source and said moving sheet or strip.

11. The combination according to claim 10 wherein a second elongated source is provided, said sources being spaced along the length of said sheet or strip such that energy envelopes therefrom impinge at spaced locations on said reflector structure, a second receiver is juxtaposed to said reflector structure, said reflective means being disposed to reflect increments of said energy envelopes to said receivers respectively.

12. The combination according to claim 1 wherein a second source and a second reflector structure are provided for inspecting a second specimen, said receiver being disposed laterally of said reflector structures and generally there between, and reflecting means on each of said structures are orientated so as to direct said energy increments to said receiver.

13. The combination according to claim 12 wherein said specimens and said reflector structures are elongated and are mounted for rotation about their respective long axes, and a transmission arrangement is provided for rotating said specimens and said reflector structures from common drive means.

14. The combination according to claim 2 wherein said receiver is mounted transversely of said rotatable member, a second energy source is spacedly and oppositely mounted relative to said first mentioned source, said rotatable member is positioned intermediately of said sources and disposed to intercept an energy envelope from each of said sources, said rotatable member having said reflective means further orientated thereon as to reflect energy increments from each of said envelopes to said receiver.

15. The combination according to claim 2 wherein means are provided for mounting a second specimen together with the first-mentioned specimen in a disposition extending transversely of said envelope but generally parallel to the rotational axis of said member, means are provided for mounting said receiver transversely of said member, said member having a first surface with said reflective means thereon, said first surface and said reflective means being orientated to direct reflected increments of that portion of said envelope passing throughh said first mentioned specimen to said receiver, said member having a second surface with additional reflective means thereon, said second surface and said additional reflective means being orientated for directing increments of that portion of said envelope passing through said second specimen to said receiver.

16. The combination according to claim 1 wherein a second source and a second receiver are provided, said second source being disposed for directing a second energy envelope onto said movable reflector structure, said reflective means being further disposed for reflecting increments of said second envelope at an angle thereto, said second receiver being positioned to receive said second envelope increments, and means are provided for mounting a second test specimen between said reflector structure and one of said second source and said second receiver.

17. The combination according to claim 16 wherein said specimens are spacedly mounted on a common platform therefor, means are provided for moving said platform in one direction relative to said energy envelopes, a pair of specimen tables are movably mounted on said platform, and means are provided for moving said tables with said specimens positioned thereon respectively in another direction relative to said energy envelopes.

18. The combination according to claim 17 wherein said sources are disposed substantially in opposite directions from said reflector structure, said one platform moving direction is transverse to said envelopes, and said other platform moving direction is longitudinally of said envelopes along substantially a common axis thereof, and means are provided for moving said tables together with said specimens in through substantial equal and opposite distances along said axis.

19. The combination according to claim 2 wherein a second source and a second reflector structure are provided for insepcting said specimen, said specimen being disposed between said first-mentioned source and said first-mentioned reflector structure and also between said second source and said second reflector structure, a second receiver is juxtaposed to said second reflector structure for receiving envelope increments reflected therefrom, said sources and said reflector structures being disposed such that energy envelopes emitted from said sources intersect prior to reaching said reflector structures respectively, and means are provided for positioning said specimen at least partially within an intersecting region of said envelopes.

20. The combination according to claim 19 wherein a drive shaft is provided for each of said reflector structure at the axis of rotation thereof, said reflector structures being mounted at an angle at one another such that adjacent ends of said drive shafts are juxtaposed, and common drive and transmission means are copuled with shafts for rotating both of said reflector structures.

21. The combination according to claim 19 wherein a third source is mounted in juxtaposition to said first-mentioned reflector structure and generally opposite from said first-mentioned source, said first-mentioned reflector structure being mounted midway between said first mentioned source and said third source, a second specimen is mounted between said third source and said first-mentioned reflector structure, a third receiver is juxtaposed to said first-mentioned reflector structure, the reflective means on said first-mentioned reflector structure being further orientated so as to reflect energy increments from said third source to said third receiver, a fourth source positioned at an angle to said third source to emit an energy envelope intersecting the energy envelope of said third source, said second specimen being disposed at least partially within the intersecting region of said third and said fourth envelopes, a third reflector structure positioned oppositely from said second specimen relative to a fourth source for interception of the energy envelope from said fourth source, a fourth receiver juxtaposed to third reflector structure, and reflective means on said third reflector structure and orientated for reflecting energy segments from said fourth source to said fourth receiver.

22. The combination according to claim 21 wherein said third reflector structure is positioned for coupling to said drive and transmission means for rotation thereby.

* * * * *